United States Patent
Soga

(10) Patent No.: US 11,252,290 B2
(45) Date of Patent: Feb. 15, 2022

(54) IMAGE PROCESSING APPARATUS, IMAGE PROCESSING METHOD AND STORAGE MEDIUM

(71) Applicant: CANON KABUSHIKI KAISHA, Tokyo (JP)

(72) Inventor: Masaya Soga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/877,647

(22) Filed: May 19, 2020

(65) Prior Publication Data

US 2020/0382654 A1 Dec. 3, 2020

(30) Foreign Application Priority Data

Jun. 3, 2019 (JP) .............................. JP2019-103751

(51) Int. Cl.
*H04N 1/00* (2006.01)
*G06T 3/40* (2006.01)
*H04N 1/393* (2006.01)

(52) U.S. Cl.
CPC ............. *H04N 1/0044* (2013.01); *G06T 3/40* (2013.01); *H04N 1/00482* (2013.01); *H04N 1/393* (2013.01); *G06T 2210/22* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 5,649,025 A | * | 7/1997 | Revankar | G06K 9/38 358/466 |
| 7,982,909 B2 | * | 7/2011 | Beato | H04N 1/32128 358/1.9 |
| 8,688,579 B1 | * | 4/2014 | Ethington | G06K 9/4609 705/42 |
| 8,724,182 B2 | * | 5/2014 | Labois | H04N 1/00803 358/474 |
| 8,970,920 B2 | * | 3/2015 | Nakamura | H04N 1/4074 358/474 |
| 9,807,280 B2 | * | 10/2017 | Misawa | G06K 9/342 |
| 10,354,352 B2 | * | 7/2019 | Otake | H04N 1/40012 |
| 2005/0134935 A1 | * | 6/2005 | Schmidtler | H04N 1/32112 358/448 |

(Continued)

FOREIGN PATENT DOCUMENTS

JP 2017-130811 A 7/2017

*Primary Examiner* — Martin Mushambo
(74) *Attorney, Agent, or Firm* — Venable LLP

(57) ABSTRACT

To enable a user to, in a case where the user scans a plurality of documents en bloc and acquires an image in units of documents by using a multi-cropping function and metadata thereon, reacquire them efficiently. A configuration is designed so that scan processing can be performed again in a preview display of the image corresponding to each document obtained by multi-cropping and it is made possible for a user to perform the scan again in a case where the user checks the scanned contents by the preview display and determines that the scan has not been performed accurately. Then, for the scanned image obtained by the re-scan, necessary analysis processing is performed only for the document for which it becomes necessary to perform the scan again.

11 Claims, 19 Drawing Sheets

(56) References Cited

U.S. PATENT DOCUMENTS

| | | | | |
|---|---|---|---|---|
| 2006/0082794 A1* | 4/2006 | Simske | H04N 1/40068 | 358/1.2 |
| 2006/0215232 A1* | 9/2006 | Ziv-el | H04N 1/3873 | 358/448 |
| 2008/0100885 A1* | 5/2008 | Onishi | H04N 1/0044 | 358/488 |
| 2010/0295868 A1* | 11/2010 | Zahnert | G06K 9/6201 | 345/634 |
| 2010/0296137 A1* | 11/2010 | Zahnert | H04N 1/107 | 358/488 |
| 2010/0296140 A1* | 11/2010 | Zahnert | H04N 1/107 | 358/505 |
| 2011/0002015 A1* | 1/2011 | Hayakawa | H04N 1/00816 | 358/448 |
| 2011/0167027 A1* | 7/2011 | Tsuchida | G06F 16/313 | 706/12 |
| 2011/0292439 A1* | 12/2011 | Nagata | H04N 1/00864 | 358/1.15 |
| 2011/0310414 A1* | 12/2011 | Morimoto | H04N 1/00737 | 358/1.9 |
| 2012/0008176 A1* | 1/2012 | Ishida | H04N 1/3872 | 358/474 |
| 2012/0050806 A1* | 3/2012 | Fukuda | H04N 1/32101 | 358/1.15 |
| 2012/0093434 A1* | 4/2012 | Banerjee | G06T 7/136 | 382/266 |
| 2013/0182002 A1* | 7/2013 | Macciola | H04N 1/387 | 345/589 |
| 2013/0329263 A1* | 12/2013 | Enomoto | H04N 1/40 | 358/470 |
| 2017/0155785 A1* | 6/2017 | Mizude | H04N 1/00734 | |
| 2018/0028292 A1* | 2/2018 | Pesach | A61B 1/24 | |
| 2018/0367695 A1* | 12/2018 | Horie | H04N 1/32128 | |
| 2019/0124229 A1* | 4/2019 | Ishino | G06T 11/60 | |
| 2019/0132462 A1* | 5/2019 | Ogawa | H04N 1/00702 | |
| 2019/0132471 A1* | 5/2019 | Fujita | H04N 1/00331 | |
| 2019/0141213 A1* | 5/2019 | Mizude | H04N 1/3873 | |
| 2019/0182389 A1* | 6/2019 | Ohwaku | H04N 1/00785 | |
| 2019/0191037 A1* | 6/2019 | Tsukahara | H04N 1/00087 | |
| 2019/0362498 A1* | 11/2019 | Shimamura | G06T 3/403 | |
| 2019/0370539 A1* | 12/2019 | Shimamura | H04N 1/3873 | |

* cited by examiner

```
{
  "Delegators":[
    {
      "UserID" :"UserB@xxxxx.com",
      "UserName":"UserB"
    },
    {
      "UserID" :"UserC@xxxxx.com",
      "UserName":"UserC"
    },
    {
      "UserID" :"UserD@xxxxx.com",
      "UserName":"UserD"
    }
  ]
}
```

FIG.8

Applicant setting — 900

Select your name in a case where you perform application, or select the user name of a proxy applicant in a case of proxy application.

User name: UserB ▼ — 902

Next — 901

FIG.9

FIG.12A
```
{
    "JobID":"12345678"
}
```

FIG.12B
```
{
    "Status":"processing"
}
```

FIG.12C
```
{
    "Status" : "completed",
    "Images" : [
        {
            "ImageID" : "image0001",
            "ContentsType" : "Receipt",
            "ReceiptData" : [
                {
                    "Date" : "20180313",
                    "Amount" : "10000"
                }
            ],
            "Points" : [2049, 361, 4665, 241, 4793, 1345, 2169, 1465]
        },
        {
            "ImageID" : "image0002",
            "ContentsType" : "Receipt",
            "ReceiptData" : [
                {
                    "Date" : "20180311",
                    "Amount" : "2000"
                }
            ],
            "Points" : [2921, 1825, 3977, 1897, 3857, 3353, 2825, 3265]
        },
        {
            "ImageID" : "image0003",
            "ContentsType" : "Receipt",
            "ReceiptData" : [
                {
                    "Date" : "20180312",
                    "Amount" : "950"
                }
            ],
            "Points" : [777, 337, 1721, 329, 1711, 2057, 769, 2049]
        }
    ]
}
```

```
{
    "ExpenseTypes": [
        {
            "ID": "0001",
            "Name": "Hotel"
        },
        {
            "ID": "0002",
            "Name": "Car Rental"
        },
        {
            "ID": "0003",
            "Name": "Fuel"
        },
        {
            "ID": "0004",
            "Name": "Parking"
        },
        {
            "ID": "0005",
            "Name": "Taxi"
        },
        {
            "ID": "0007",
            "Name": "Breakfast"
        },
        {
            "ID": "0008",
            "Name": "Lunch"
        },
        {
            "ID": "0009",
            "Name": "Dinner"
        },
        {
            "ID": "0010",
            "Name": "Business Meals"
        }
    ]
}
```

FIG.13

Metadata setting — 1400

1410

RECEIPT
Vehicle No.1234
  March 11, 2018
Amount
            ¥2,000

Thank you for your ride.

○○Transportation Inc.
TEL:000-000-0000

Expense Type: | Taxi ▼ | — 1404
Transaction Date: | 2018/3/11 | — 1405
Amount: | 2000 | — 1406
Location: | Tokyo | — 1407

| Re-scan (1408) | Back (1403) | Next (1402) | Transmit (1401) |

FIG.14

```
{
    "ExpenseTypeID": "0005",
    "TransactionDate": "20180311",
    "Amount": "2000",
    "Location": "Tokyo"
}
```

FIG.15

```
}
  [
      "Status" : "completed",
      "Images" : [
          {
              "ImageID" : "re-image0002",
              "ContentsType" : "Receipt",
              "ReceiptData" : [
                  {
                      "Date" : "20180311",
                      "Amount" : "2000"
                  }
              ],
              "Points" : [2932, 1828, 3955, 1900, 3856, 3343, 2815, 3270]
          },
      ]
}
```

FIG.18

IMAGE PROCESSING APPARATUS, IMAGE PROCESSING METHOD AND STORAGE MEDIUM

BACKGROUND OF THE INVENTION

Field of the Invention

The present disclosure relates to multi-cropping processing of a scanned image.

Description of the Related Art

For example, a system exists conventionally, which performs expense settlement by computerizing a receipt. At the time of receipt computerization, by scanning a plurality of receipts at the same time and using a scanner apparatus comprising a multi-cropping function to generate an image in units of documents from the obtained scanned image, it is possible to computerize a plurality of receipts en bloc.

At the time of computerizing a plurality of receipts by using the above-described multi-cropping function, unless each receipt is placed correctly on the document table, it is not possible to crop an appropriate image in units of receipts from a scanned image. As regards this point, Japanese Patent Laid-Open No. 2017-130811 has disclosed a technique to detect a fold of a receipt placed on the document table and an overlap between receipts and issue a warning as well as preview-displaying an entire scanned image. However, with the technique of Japanese Patent Laid-Open No. 2017-130811, in a case where the system erroneously determines that there is no overlap despite that receipts overlap actually, no preview display is produced, and therefore, it is not possible for a user to notice the overlap between receipts. Further, in a case where a receipt floats up over the document table due to a bend or the like of the receipt, it is no longer possible to correctly extract character information within the receipt, but with the technique of Japanese Patent Laid-Open No. 2017-130811, no preview display is produced, and therefore, it is not possible for a user to notice the floating of the receipt.

The technique of the present disclosure has been made in view of the above-described problems and an object thereof is to enable a user to, in a case where the user scans a plurality of documents en bloc and acquires the image in units of documents by using a multi-cropping function and metadata thereon, perform reacquisition efficiently.

SUMMARY OF THE INVENTION

The image processing apparatus according to the present disclosure includes: at least one memory that stores a program; and at least one processor that executes the program to perform: giving instructions to perform analysis processing to crop a document image corresponding to each of a plurality of documents from a scanned image generated by scanning the plurality of documents placed on a document table of a scanner and extract a specific character string from each cropped document image; and displaying a first user interface screen for setting metadata for each document image on a display unit in units of the document images based on results of the analysis processing, and on the first user interface screen: the document image is preview-displayed; the specific character string corresponding to an item of the metadata obtained by the analysis processing is displayed; and an input element exists that causes the scanner to perform a scan again, and in a case where a scan is performed again for the plurality of documents by the scanner based on a user operation to the input element, instructions to perform the analysis processing for a re-scanned image are given along with information for specifying an image area corresponding to a document image relating to the preview display in the re-scanned image obtained by the re-execution.

Further features of the present disclosure will become apparent from the following description of exemplary embodiments with reference to the attached drawings.

BRIEF DESCRIPTION OF THE DRAWINGS

FIG. 8 is a diagram showing an example of a proxy applicant list;

FIG. 9 is a diagram showing an example of an Applicant setting screen;

FIG. 12A is a diagram showing an example of a request ID, FIG. 12B is a diagram showing an example of a response indicating that processing is in progress, and FIG. 12C is a diagram showing an example of a response indicating that processing is completed;

FIG. 13 is a diagram showing an example of metadata item information;

FIG. 14 is a diagram showing an example of a Metadata setting screen;

FIG. 15 is a diagram showing an example of data that is transmitted along with a metadata setting request;

FIG. 18 is a diagram showing an example of a response indicating completion of analysis processing for a re-scanned image.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

System Configuration

Figure 1:
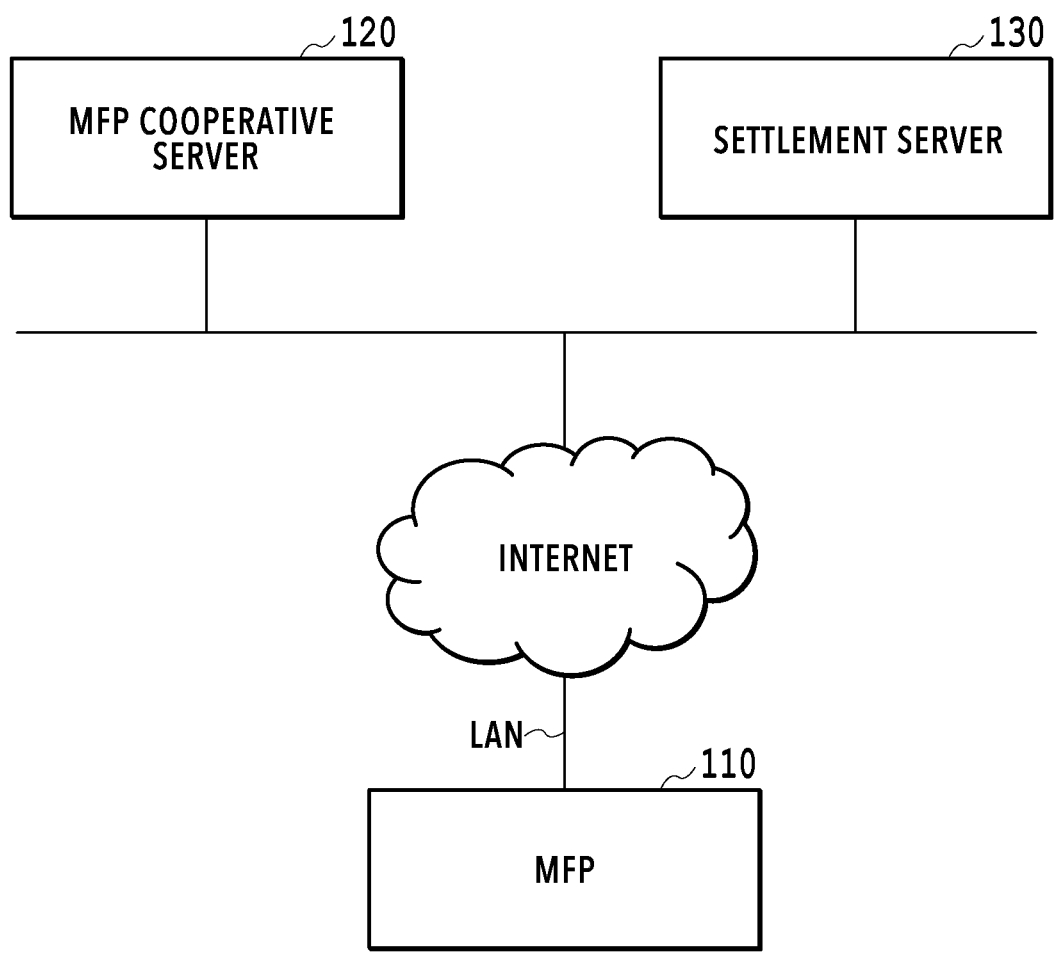
FIG. 1 is a diagram showing an entire configuration of an image processing system.

FIG. 1 is a diagram showing the entire configuration of an image processing system 100 according to the present embodiment. The image processing system 100 includes an MFP (Multi Function Peripheral) 110 and server apparatuses 120 and 130 providing cloud services on the internet. The MFP 110 is connected with the server apparatuses 120 and 130 so as to be capable of communication via the internet.

The MFP 110 is an example of an information processing apparatus having the scan function. The MFP 110 is a multi function peripheral having a plurality of functions, such as the print function and the BOX save function, in addition to the scan function. Both the server apparatuses 120 and 130 are each an example of an information processing apparatus providing cloud services. The server apparatus 120 of the present embodiment provides cloud services to perform predetermined image analysis processing for scanned image data received from the MFP 110, transfer a request from the MFP 110 to the server apparatus 130 providing other services, and so on. In the following, the cloud service provided by the server apparatus 120 is called "MFP cooperative service". The server apparatus 130 provides a cloud service (hereinafter, called "expense settlement service") for performing expense settlement efficiently. In the expense settlement service, in a case where receipts are saved and managed by associating the images of the receipts with additional information (metadata), such as dates of the receipts, or a person other than the person who has received a receipt performs the computerization work of the receipt, it is possible to set a person (proxy applicant) who performs the work, and so on. Hereinafter, the server apparatus 120 that provides the MFP cooperative service is called "MFP cooperative server" and the server apparatus 130 that provides the expense settlement service is called "settlement server".

The configuration of the image processing system 100 shown in FIG. 1 is an example and the configuration is not limited to this. For example, the MFP 110 may also have the function of the MFP cooperative server 120. Further, the MFP cooperative server 120 may be connected with the MFP 110 via a LAN (Local Area Network) in place of the internet. Furthermore, in the present embodiment, explanation is given by taking a receipt as an example of the computerization work-target document, but the target document is not limited to a receipt.

Hardware Configuration of MFP

Figure 2:
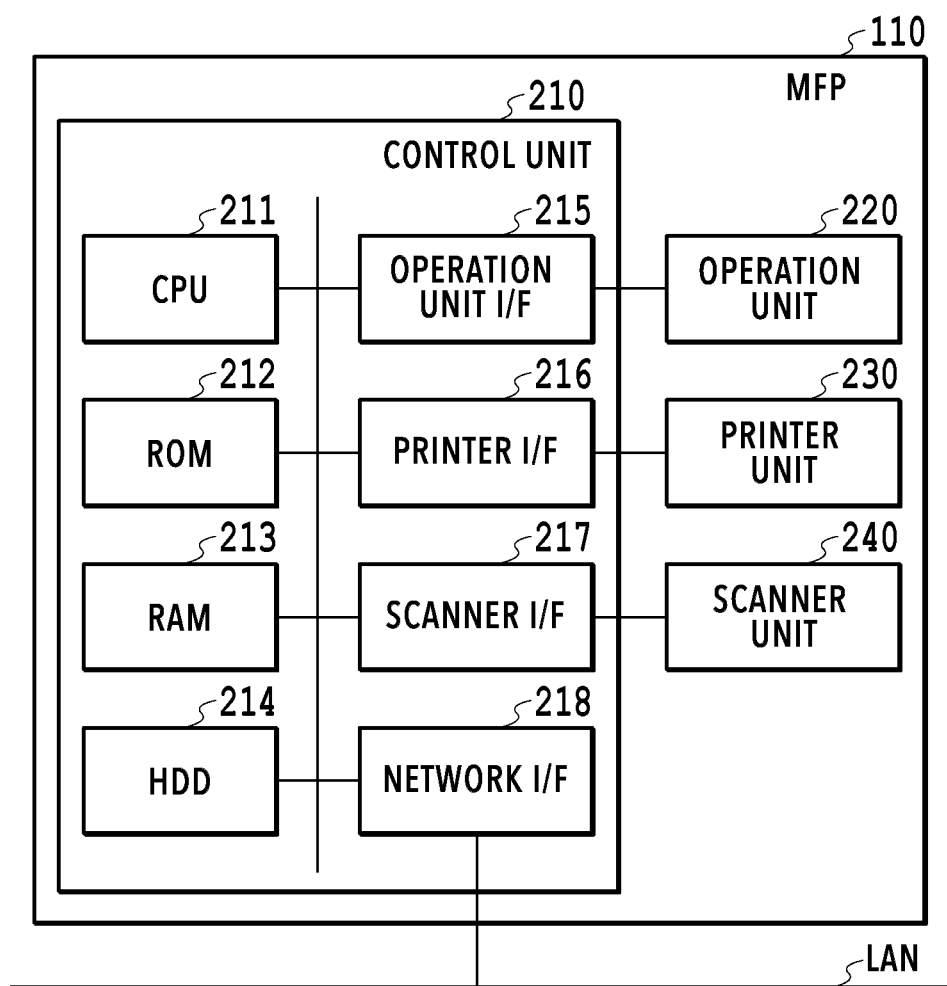
FIG. 2 is a block diagram showing a hardware configuration of an MFP.

FIG. 2 is a block diagram showing the hardware configuration of the MFP 110. The MFP 110 includes a control unit 210, an operation unit 220, a printer unit 230, and a scanner unit 240. The control unit 210 further includes each of units 211 to 218 below and controls the operation of the entire MFP 110. The CPU 211 reads a variety of control programs (programs corresponding to various functions shown in the software configuration diagram, to be described later) stored in the ROM 212 and executes the programs. The RAM 213 is used as a temporary storage area, such as a main memory and a work area, of the CPU 211. In the present embodiment, the one CPU 211 performs each piece of processing shown in the flowchart, to be described later, by using one memory (RAM 213 or HDD 214), but the present embodiment is not limited to this. For example, it may also be possible to perform each piece of processing by causing a plurality of CPUs and a plurality of RAMs or HDDs to cooperate with each other. The HDD 214 is a large-capacity storage unit configured to store image data and various programs. The operation unit I/F 215 is an interface that connects the operation unit 220 and the control unit 210. The operation unit 220 is provided with a touch panel and a hard key and receives operations/inputs/instructions by a user. The printer I/F 216 is an interface that connects the printer unit 230 and the control unit 210. Image data for printing is transferred from the control unit 210 to the printer unit 230 via the printer I/F 216 and printed on a printing medium, such as paper. The scanner I/F 217 is an interface that connects the scanner unit 240 and the control unit 210. The scanner unit 240 inputs an image (scanned image) obtained by scanning a document that is set on a document table or ADF (Auto Document Feeder), not shown schematically, to the control unit 210 via the scanner I/F 217. It is possible to print (copy and output) the scanned image data generated by the scanner unit 240 in the printer unit 230, save the data in the HDD 214, transmit the data to an external apparatus via a LAN, and so on. The network I/F 218 is an interface that connects the control unit 210 (MFP 110) to a LAN. The MFP 110 transmits scanned image data to the MFP cooperative server 120, receives various kinds of data from the MFP cooperative server 120, and so on, by using the network I/F 218. The hardware configuration of the MFP 110 explained above is an example and the hardware configuration may comprise another configuration as needed or may not have a part of the configuration.

Hardware Configuration of Server Apparatus

Figure 3:
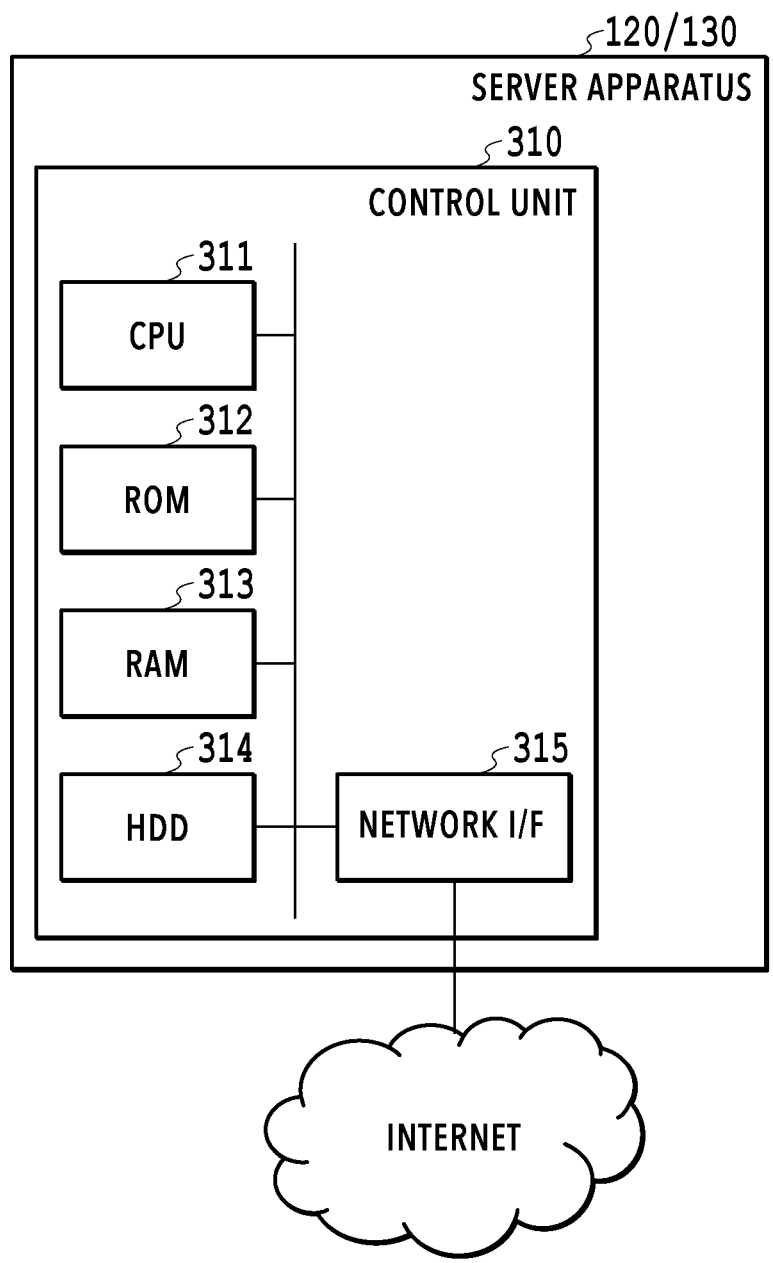
FIG. 3 is a block diagram showing a hardware configuration of an MFP cooperative server and a settlement server.

FIG. 3 is a block diagram showing the hardware configuration of the MFP cooperative server 120/the settlement server 130. The MFP cooperative server 120 and the settlement server 130 have the common hardware configuration and include a CPU 311, a ROM 312, a RAM 313, an HDD 314, and a network I/F 315. The CPU 311 controls the entire operation by reading control programs stored in the ROM 312 and performing various kinds of processing. The RAM 313 is used as a temporary storage area, such as a main memory and a work area, of the CPU 311. The HDD 314 is a large-capacity storage unit configured to store image data and various programs. The network I/F 315 is an interface that connects a control unit 310 to the internet. The MFP cooperative server 120 and the settlement server 130 receive requests for various kinds of processing from other apparatuses (MFP 110 and the like) via the network I/F 315 and return processing results in accordance with the requests.

Software Configuration of Image Processing System

Figure 4:
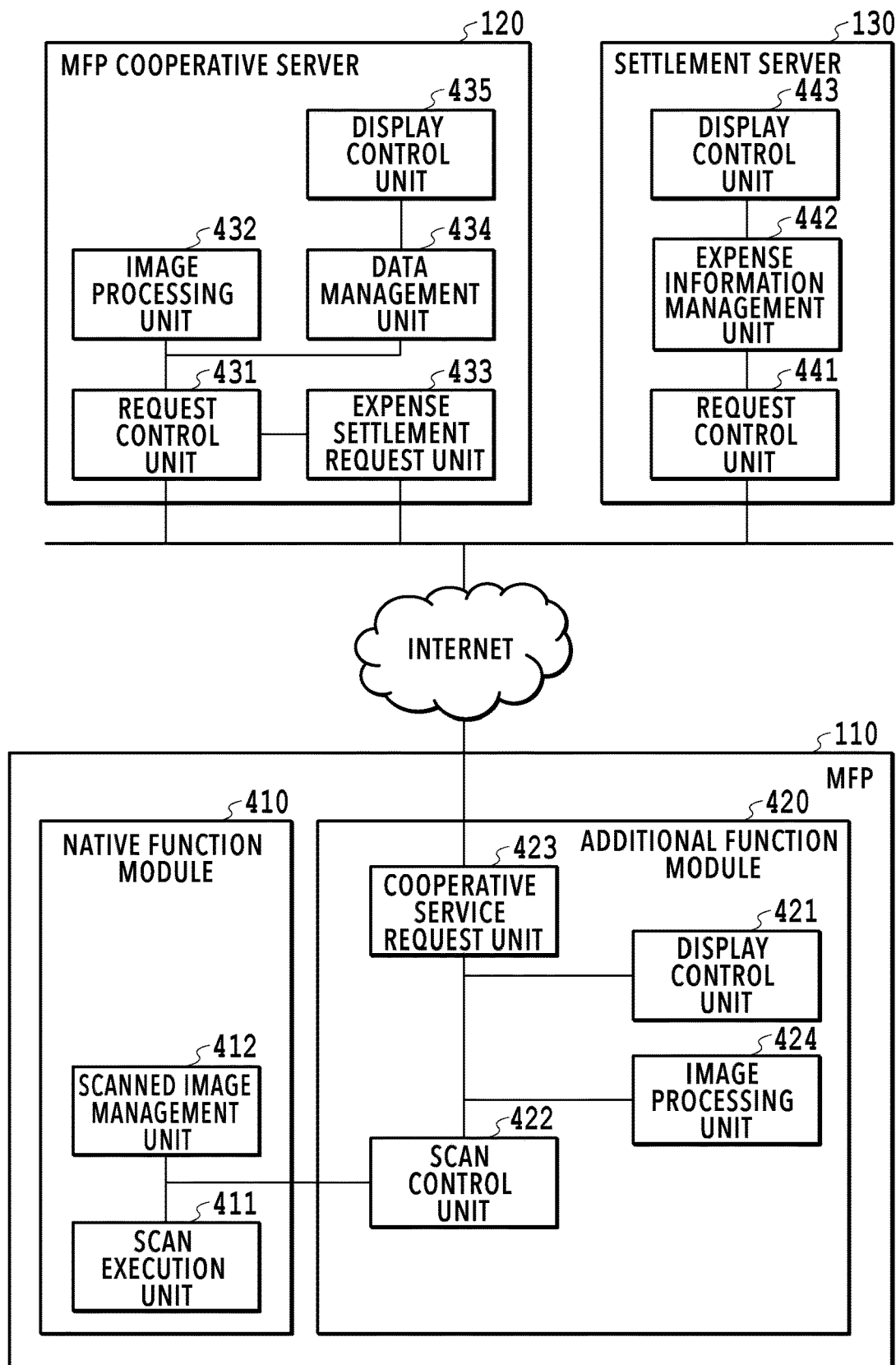
FIG. 4 is a block diagram showing a software configuration of the image processing system.

FIG. 4 is a block diagram showing the software configuration of the image processing system 100 according to the present embodiment. In the following, the software configuration corresponding to the role of each of the MFP 110, the MFP cooperative server 120, and the settlement server 130, which configure the image processing system 100, is explained in order. In the following, explanation is given by narrowing the various functions possessed by each apparatus to the functions relating to the processing to scan a receipt as a document and perform expense settlement.

Software Configuration of MFP

The function modules of the MFP 110 are roughly divided into a native function module 410 and an additional function module 420. While the native function module 410 is an application provided as a standard one in the MFP 110, the additional function module 420 is an application that is installed additionally in the MFP 110. The additional function module 420 is an application based on Java (registered trademark) and it is possible to easily implement the addition of a function to the MFP 110.

The native function module 410 has a scan execution unit 411 and a scanned image management unit 412. Further, the additional function module 420 has a display control unit 421, a scan control unit 422, a cooperative service request unit 423, and an image processing unit 424.

The display control unit 421 displays a user interface screen (hereinafter, described as "UI screen") for receiving various operations by a user on a liquid crystal display unit having the touch panel function of the operation unit 220. The various operations include, for example, inputting of log-in authentication information for accessing the MFP cooperative server 120, selection of a proxy applicant in a case where a proxy applicant performs the receipt computerization work, scan setting, giving of scan start instructions, inputting of metadata, and the like.

The scan control unit 422 gives instructions to perform scan processing to the scan execution unit 411 along with scan setting information in accordance with the user operation (for example, pressing down of "Start scan" button) performed on the UI screen. The scan execution unit 411 causes the scanner unit 240 to perform the document reading operation via the scanner I/F 217 and generates scanned image data in accordance with the instructions to perform scan processing from the scan control unit 422. The generated scanned image data is saved in the HDD 214 by the scanned image management unit 412. At this time, the scan control unit 422 is notified of information on a scanned image identifier uniquely indicating the saved scanned image data.

The cooperative service request unit 423 makes requests for various kinds of processing to the MFP cooperative server 120, receives responses thereto, and so on. The various kinds of processing include, for example, log-in authentication, acquisition of a list of proxy applicants who can perform expense settlement as a proxy, execution of analysis processing for scanned image data obtained by scanning a plurality of receipts, acquisition of metadata item information, setting of metadata, and the like. For transmission and reception with the MFP cooperative server 120, the communication protocol, for example, such as REST and SOAP, is used.

The image processing unit 424 generates an image used on the UI screen that is displayed by the display control unit 421 by performing predetermined image processing for scanned image data obtained by scanning a plurality of receipts. Details of the predetermined image processing will be described later.

Software Configuration of Server Apparatus

First, the software configuration of the MFP cooperative server 120 is explained. The MFP cooperative server 120 has a request control unit 431, an image processing unit 432, an expense settlement request unit 433, a data management unit 434, and a display control unit 435. The request control unit 431 stands by in the state of being capable of receiving a request from an external apparatus and instructs the image processing unit 432, the expense settlement request unit 433, and the data management unit 434 to perform predetermined processing in accordance with received request contents. The image processing unit 432 performs analysis processing, such as multi-cropping processing, OCR processing, and value extraction processing, for scanned image data that is sent from the MFP 110. The expense settlement request unit 433 makes requests for various kinds of processing relating to the expense settlement service to the settlement server 130, receives the responses thereto, and so on. The various kinds of processing include, for example, acquisition of lists of proxy applicants and the types of expense, registration of an image corresponding to each individual receipt obtained by the multi-cropping processing, setting of metadata corresponding to each image, and the like. In the present specification, the image in units of documents, which is obtained by the multi-cropping processing, is called "cropped image" or "document image". Further, there is a case where the document image is particularly called "receipt image" on a condition that the document is a receipt. The data management unit 434 stores and manages user information, various kinds of setting data, and the like, which are managed in the server apparatus 120. The display control unit 435 receives a request from the web browser running on a PC or a mobile terminal (neither of them is shown schematically) connected via the internet and returns screen configuration information (HTML, CSS, and the like) that is necessary for the screen display. It is possible for a user to check the registered user information, change the scan setting, and so on, via the screen displayed on the web browser.

Next, the software configuration of the settlement server 130 is explained. The settlement server 130 has a request control unit 441, an expense information management unit 442, and a display control unit 443. The request control unit 441 stands by in the state of being capable of receiving a request from an external apparatus and in the present embodiment, returns information that is managed by the expense information management unit 442 to the MFP cooperative server 120 in response to the request from the MFP cooperative server 120. The display control unit 443 receives a request from a web browser running on a PC or a mobile terminal (neither of them is shown schematically) connected via the internet and returns screen configuration information (HTML, CSS, and the like) that is necessary for the screen display. It is possible for a user to check the expense information including information on a registered expense report and receipt images, and so on, via the screen that is displayed on the web browser.

Flow of Processing of Entire Image Processing System

Figure 5A:
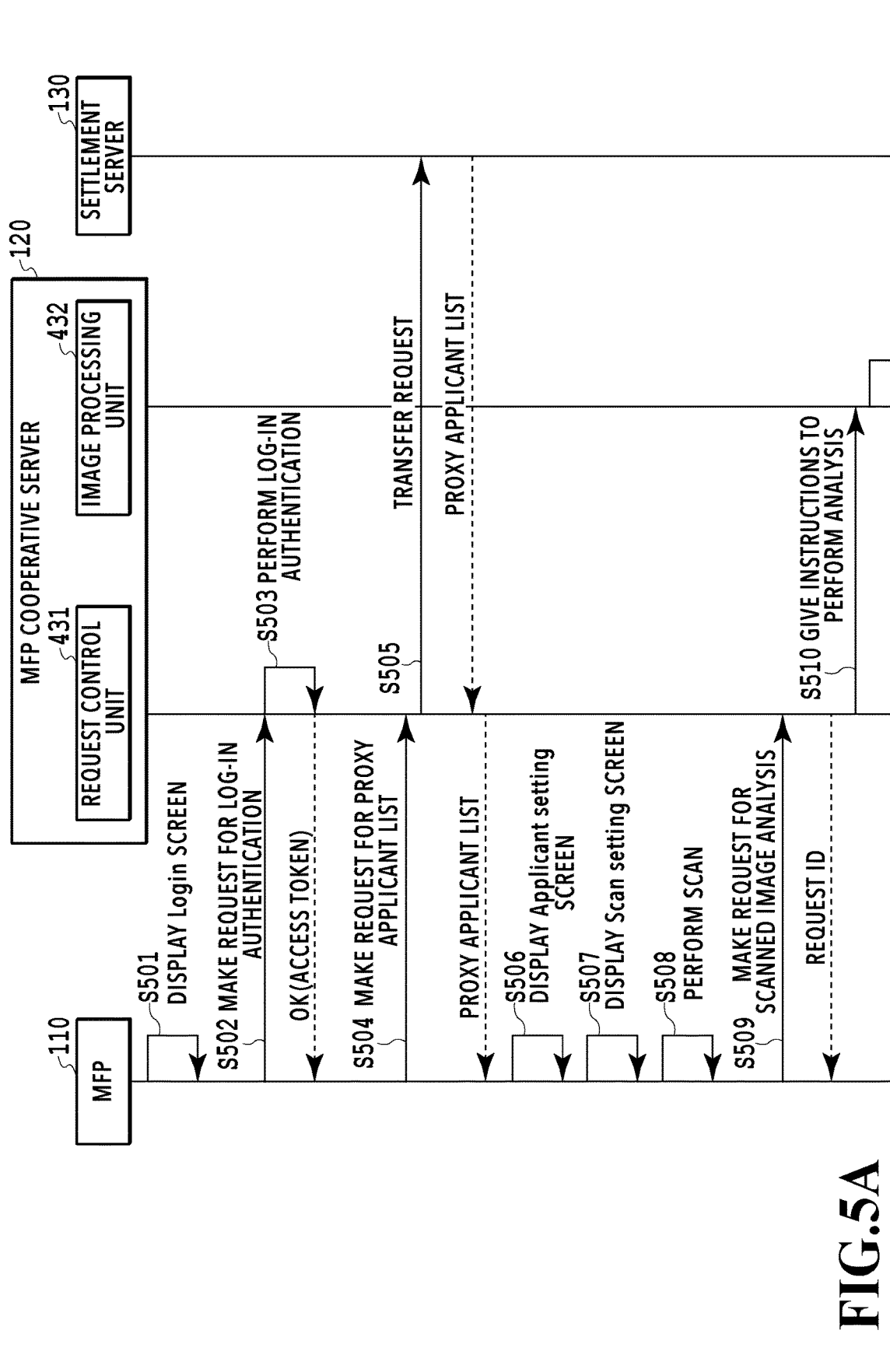
FIG. 5 is a diagram showing a relationship between FIGS. 5A and 5B, and FIGS. 5A and 5B are sequence diagrams showing a flow of processing among apparatuses at the time of performing expense settlement by a cloud service.
Figure 5B:
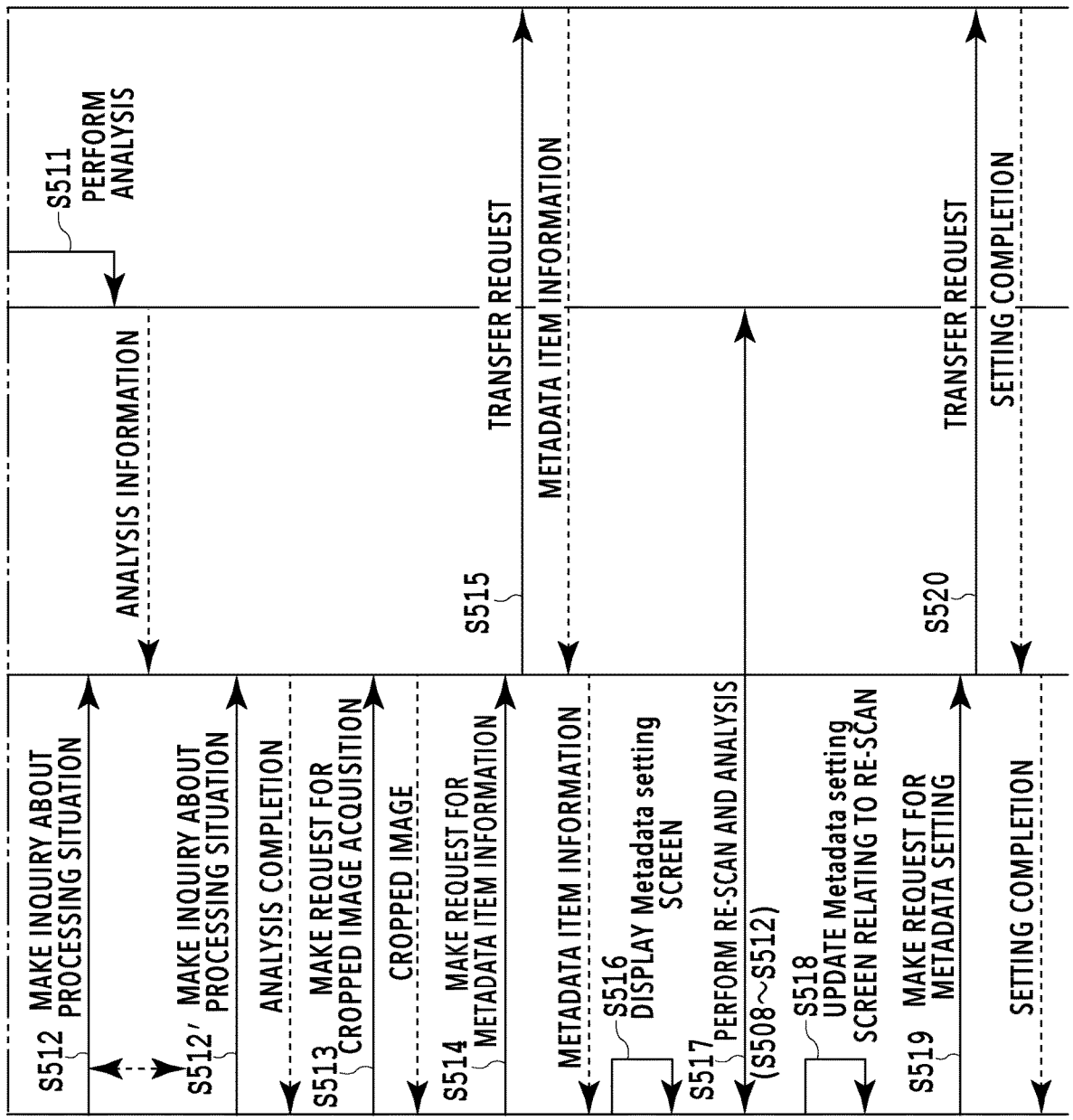
Figure 6:
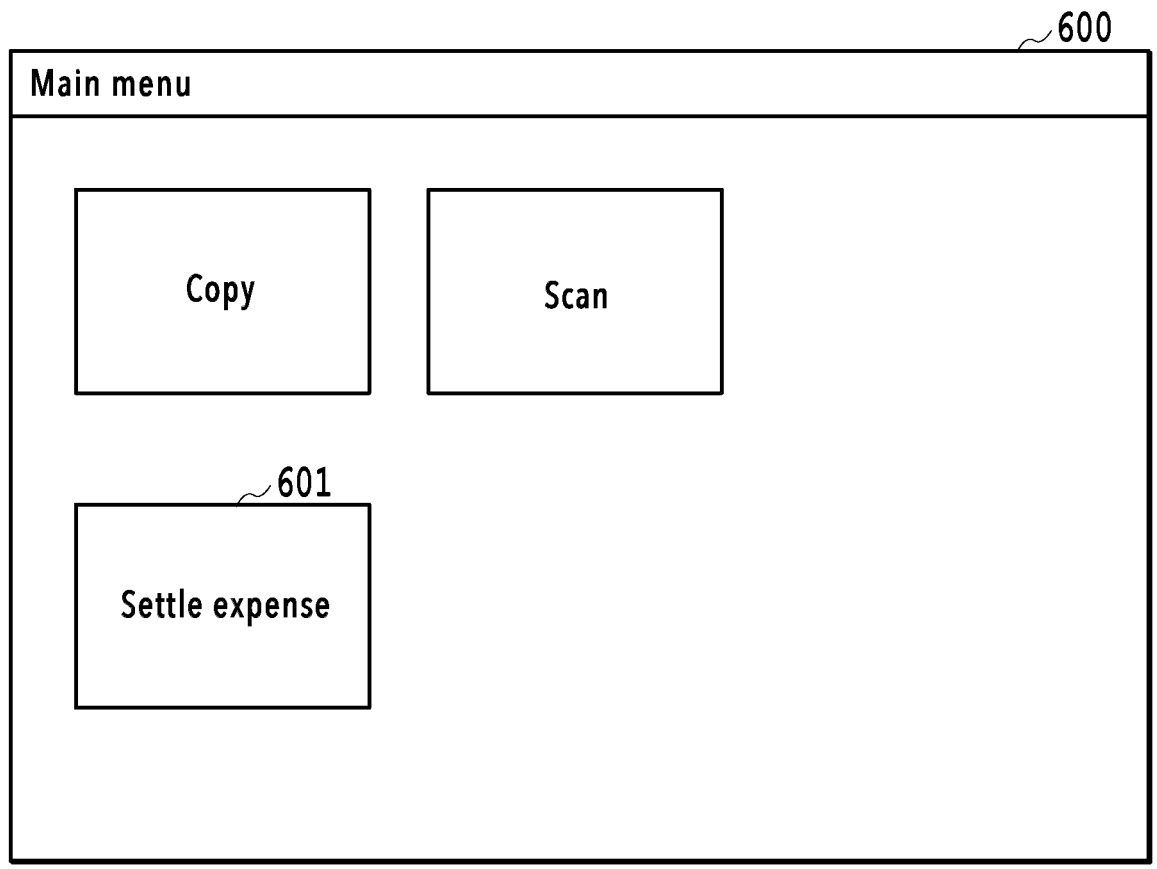
FIG. 6 is a diagram showing an example of a Main menu screen.

FIGS. 5A and 5B are sequence diagrams showing a flow of processing among the apparatuses at the time of scanning a receipt in the MFP 110 and performing expense settlement by the cloud service. FIG. 6 is a diagram showing an example of a UI screen of a Main menu (hereinafter, described as "Main screen") that is displayed at the time of the activation of the MFP 110. By installing a dedicated application necessary to use the expense settlement service in the MFP 110, a "Settle expense" button 601 is displayed on a Main screen 600. Then, in a case where a user presses down the "Settle expense" button 601 among the menu buttons displayed within the Main screen 600, the series of processing shown in the sequence diagram in FIGS. 5A and 5B starts. In the following, along the sequence diagrams in FIGS. 5A and 5B, the operations among the apparatuses are explained in a time series. In the following explanation, symbol "S" represents a step.

Figure 7:
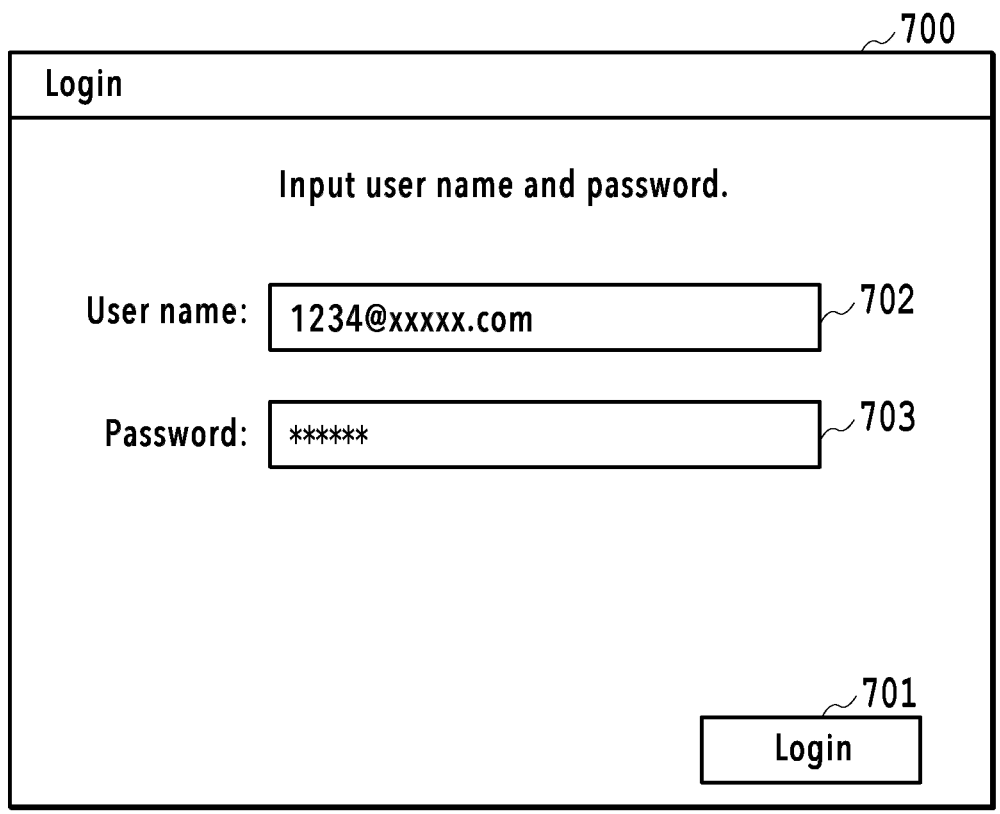
FIG. 7 is a diagram showing an example of a Login screen.

The MFP 110 displays a UI screen (hereinafter, described as "Login screen") on which to input information on log-in authentication for accessing the MFP cooperative server 120 on the operation unit 220 (S501). FIG. 7 shows an example of a Login screen. In a case where a user inputs a user ID and a password, which are registered in advance, in input fields 702 and 703, respectively, on a Login screen 700 and presses down a "Login" button 701, a request for log-in authentication is transmitted to the MFP cooperative server 120 (S502).

The MFP cooperative server 120 having received the request for log-in authentication performs authentication processing by using the user ID and the password, which are included in the request (S503). In a case where it is checked that the user is a genuine user by the results of the authentication processing, the MFP cooperative server 120 returns an access token to the MFP 110. After this, by sending this access token together at the time of the MFP 110 making various requests to the MFP cooperative server 120, a log-in user is specified. In the present embodiment, it is assumed that at the same time the login to the MFP cooperative server 120 is completed, the login to the settlement server 130 is also completed. Because of this, a user performs in advance association between the user ID for using the MFP cooperative service and the user ID for using the expense settlement service via a web browser or the like of the PC (not shown schematically) on the internet. Due to this, in a case where the log-in authentication to the MFP cooperative server 120 succeeds, the log-in authentication to the settlement server 130 is also completed at the same time and it is possible to omit the operation to log in to the settlement server 130. Then, it is made possible for the MFP cooperative server 120 to deal with a request relating to the expense settlement service from a user who has logged in to the MFP cooperative server 120. Generally, it is possible to perform the log-in authentication method by using a publicly known method (Basic authentication, Digest authentication, authentication using OAuth, and the like).

In a case where login is completed, the MFP 110 transmits an acquisition request for the proxy applicant list to the MFP cooperative server 120 along with the access token of the log-in user (S504). The proxy applicant list is name list information specifying a target person, who is a log-in user and can be a proxy applicant, in a case where a person other than the person who has received a receipt performs the receipt computerization work in the expense settlement service (proxy application). The proxy applicant list includes, for example, another user in a certain relationship with the log-in user, who is in the environment in which the same MFP 110 is used, such as a colleague in the department to which the log-in user belongs and the proxy applicant list is created in advance by, for example, a manager or the like. The MFP cooperative server 120 having received the acquisition request for the proxy applicant list transmits the acquisition request for the proxy applicant list of the log-in user specified by the access token to the settlement server 130 (S505). The settlement server 130 having received the acquisition request for the proxy applicant list reads the proxy applicant list for the log-in user and returns it to the MFP cooperative server 120. Then, the MFP cooperative server 120 transmits the proxy applicant list received from the settlement server 130 to the MFP 110. Due to this, the list information on "UserID" and "UserName" of a target person who is a log-in user and can be a proxy applicant as shown in FIG. 8 is acquired by the MFP 110. It may also be possible to transmit the proxy applicant list stored in the settlement server 130 to the MFP 110 as it is, or transmit it after changing the whole or a part of the format.

The MFP 110 having received the proxy applicant list displays a UI screen for setting an applicant (hereinafter, described as "Applicant setting screen") on the operation unit 220 (S506). FIG. 9 shows an example of an Applicant setting screen. In a selection field 902 on an Applicant setting screen 900, a list including the user names included in the proxy applicant list plus the user name of the log-in user him/herself is displayed in a pulldown menu as selection candidates. The log-in user selects the user name of him/herself in a case of performing the computerization work of a receipt received by the log-in user him/herself, or selects the user name of a proxy applicant in a case of performing the computerization work of a receipt received by a third person as a proxy applicant, and presses down a "Next" button 901.

Figure 10:
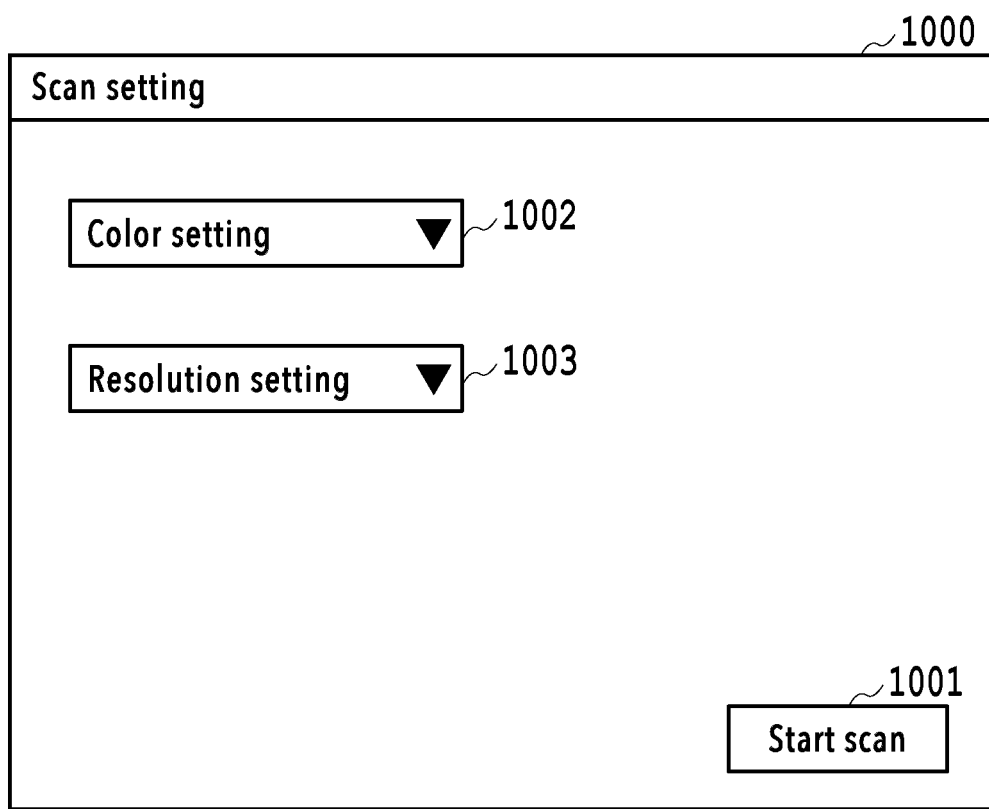
FIG. 10 is a diagram showing an example of a Scan setting screen.
Figure 11A:
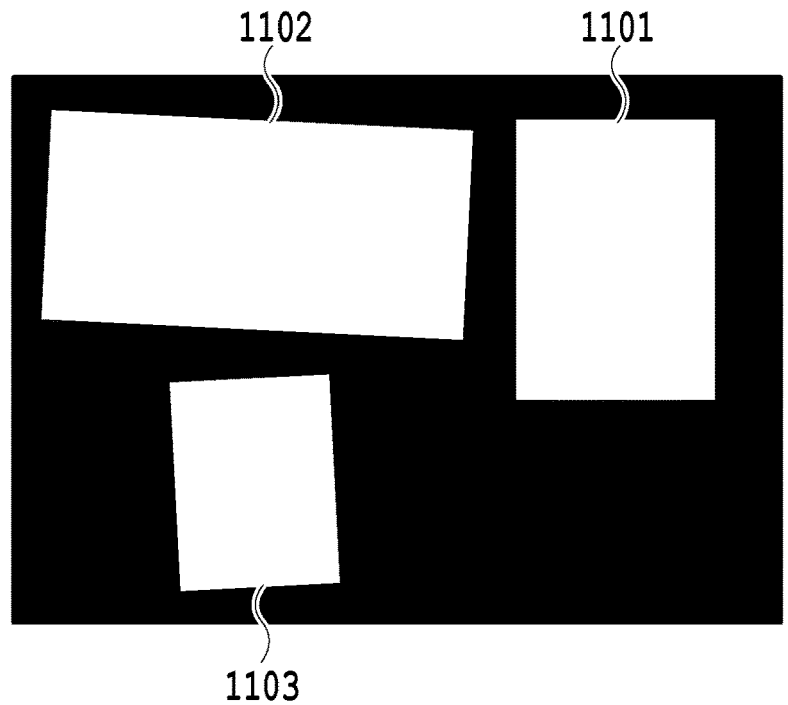
FIG. 11A and FIG. 11B are diagrams showing the way a plurality of receipts is scanned and FIG. 11A is a diagram showing a state where the receipts are placed with their surfaces facing downward and FIG. 11B is a diagram in a case where the receipts are viewed from inside a document table.
Figure 11B:
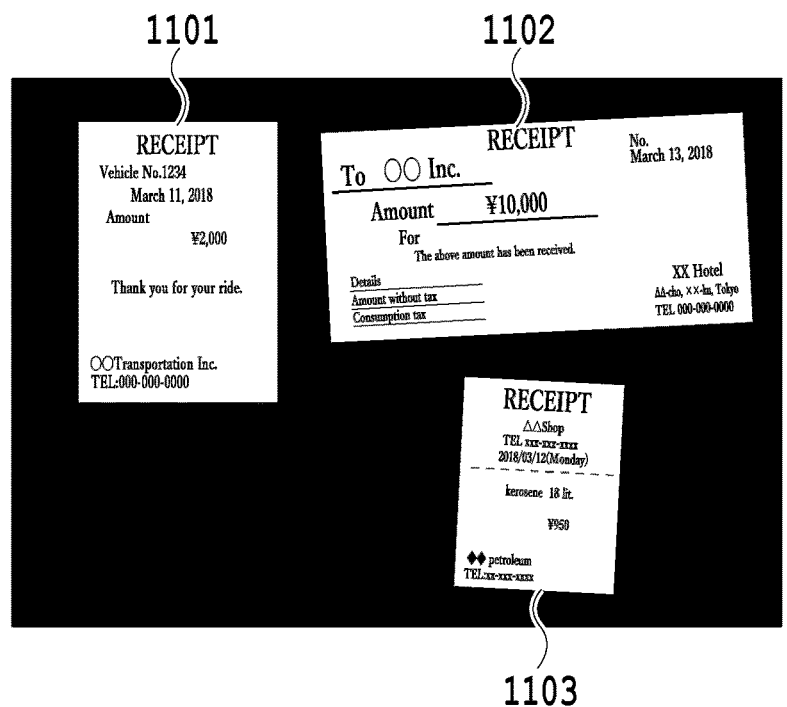

In a case where the "Next" button 901 is pressed down, a UI screen for setting operation conditions at the time of scan (hereinafter, described as "Scan setting screen") is displayed on the operation unit 220 (S507). FIG. 10 shows an example of a Scan setting screen. On a Scan setting screen 1000, a "Start scan" button 1001, a Color setting field 1002, and a Resolution setting field 1003 exist. The "Start scan" button 1001 is a button for giving instructions to start scan processing for a document (in the present embodiment, a plurality of receipts) set on the document table. In the Color setting field, the color mode at the time of scan is set. For example, it is possible to specify one of alternatives, such as full color and monochrome. In the Resolution setting field 1003, the resolution at the time of scan is set. For example, it is possible to specify one of alternatives, such as 600 dpi and 1,200 dpi. The setting items of the color mode and the resolution are an example and it is not necessary for all of these setting items to exist, or another setting item other than these may exist. Further, it may also be possible to limit the alternatives relating to the color mode or the resolution only to the setting values required in the expense settlement service. A log-in user performs detailed condition setting as to the scan processing via the Scan setting screen 1000 such as this. In a case where a log-in user having completed the scan setting sets a scan-target receipt on the document table of the MFP 110 and presses down the "Start scan" button 1001, a scan is performed (S508). FIG. 11A and FIG. 11B are each a diagram showing the way three receipts are scanned en bloc and FIG. 11A shows a state where each receipt is placed on the document table with the read-target surface facedown and FIG. 11B shows a state where the receipts are viewed from inside the document table. In this manner, a plurality of receipts is scanned at the same time. After the scan is completed, the MFP 110 transmits the image data obtained by the scan to the MFP cooperative server 120 along with an analysis request therefor (S509).

In the MFP cooperative server 120 having received the analysis request for the scanned image, the request control unit 431 instructs the image processing unit 432 to perform analysis processing including the multi-cropping processing (S510). At that time, the request control unit 431 returns a request ID capable of uniquely specifying the received analysis request to the MFP 110. FIG. 12A shows an example of the request ID. On the other hand, the image processing unit 432 having received the instructions to perform analysis processing performs analysis processing for the scanned image (S511). In this analysis processing, first, the multi-cropping processing is performed. Then, for the image area corresponding to each individual document detected by the multi-cropping processing, rotation processing, optical character recognition (OCR) processing, value extraction processing, and document type detection processing are performed. Specifically, first, in a case where each image area corresponding to each individual document is inclined, modification is performed so that the state is brought about where each side of the document is horizontal or vertical. Then, character information is specified by performing OCR processing for each modified image area. Then, from each image area, information on a specific character string (hereinafter, called "value information"), such as the date and the amount, is extracted. Further, by detecting the document type, the kind of document corresponding to each image area is specified. The analysis results thus obtained are delivered to the request control unit 431.

While the above-described analysis processing is being performed, the MFP 110 periodically (for example, every three seconds or the like) makes an inquiry about the processing situation to the MFP cooperative server 120 by using the above-described request ID (S512 to S512'). This inquiry is made repeatedly until the completion response of the analysis processing from the MFP cooperative server 120 is acquired. Upon receipt of the inquiry about the processing situation, the MFP cooperative server 120 checks the progress situation of the analysis processing corresponding to the request ID. Then, in a case where the analysis processing is not completed, the MFP cooperative server 120 returns a response (see FIG. 12B) indicating that the processing is in progress and in a case where the analysis processing is completed, returns a response (see FIG. 12C) indicating completion. As shown in FIG. 12C, the response at the time of completion of the processing includes information on the analysis results of the scanned image, in addition to the status information. FIG. 12C corresponds to FIG. 11 described previously and shows information on the analysis results of the scanned image obtained by scanning three receipts. First, in "Status", the character string (completed) whose contents indicate completion is input. In "Images", each piece of information on "ImageID", "ContentsType", and "ReceiptData" is stored for each cropped image corresponding to the document detected by the multi-cropping processing. "ImageID" is ID information identifying each cropped image, which is represented by a character string using, for example, URL or a URL parameter. By specifying this ImageID and transmitting an acquisition request to the MFP cooperative server 120, it is possible to acquire the cropped image of the specific document. "ContentsType" indicates the detected kind of document. For example, in a case of "receipt", the character string is "Receipt", in a case of "business card", the character string is "BusinessCard", in a case of "driver's license", the character string is "DriverLicense", and so on. "ReceiptData" is information that is included additionally in a case where "ContentsType" is "Receipt" indicating a receipt, and the value of "Date" representing the date and the value of "Amount" representing the total amount, which are obtained by the value extraction processing, are stored. "Points" is coordinate information indicating in which area of the scanned image the document is located. The coordinate information indicates each position of the top-left corner, the top-right corner, the bottom-right corner, and the bottom-left corner of each cropped image in order from the top-left corner with the top-left corner of the scanned image being taken as the origin (x, y)=(0, 0).

After receiving the completion response of the analysis processing, the MFP 110 specifies ImageID of the cropped image of the receipt, which is displayed first, and transmits an image acquisition request to the MFP cooperative server 120 (S513). Upon receipt of the image acquisition request, the MFP cooperative server 120 returns the data on the cropped image corresponding to ImageID to the MFP 110. The orientation of this cropped image is correct due to the rotation processing.

Next, the MFP 110 transmits an acquisition request for metadata item information to the MFP cooperative server 120 (S514). The metadata item information is list information describing contents (for example, the purpose of use of a receipt) of the metadata item that is registered in association with each document image. FIG. 13 shows an example of the metadata item information. In "ExpenseTypes", as a defined value representing the purpose of use of the receipt, a character string of "ID" and a character string of "Name" are included. Upon receipt of the acquisition request for the metadata item information from the MFP 110, the MFP cooperative server 120 transmits an acquisition request corresponding thereto to the settlement server 130 and acquires the metadata item information on the log-in user (S515). It may also be possible for the MFP cooperative server 120 to return the metadata item information acquired from the settlement server 130 to the MFP 110 as it is, or returns what is modified appropriately. For example, in a case where a plurality of pieces of the metadata item information is necessary in order to satisfy the acquisition request from the MFP 110, first, the MFP cooperative server 120 acquires them by transmitting an acquisition request for the plurality of pieces of the metadata item information to the settlement server 130. Then, in a case where the MFP cooperative server 120 returns a response to the MFP 110, it may also be possible to return information obtained by integrating each piece of the metadata item information into one piece. On the contrary, it may also be possible to return information obtained by selecting necessary information from the metadata item information returned by the settlement server 130.

The MFP 110 having received the metadata item information displays a UI screen (hereinafter, described as "Metadata setting screen") for setting metadata to each receipt image on the operation unit 220 based on the results of the scanned image analysis (S516). This Metadata setting screen is generated in units of documents (here, in units of receipts) extracted from the scanned image and displayed on the operation unit 220. FIG. 14 shows an example of the Metadata setting screen. In an image display area 1410 on a Metadata setting screen 1400, the metadata setting-target receipt image is subjected to reduction processing and preview-displayed. Further, on the Metadata setting screen 1400, a variety of buttons exist as input elements for a user to give various instructions. A "Next" button 1402 or a "Back" button 1403 is a button for switching displays of the Metadata setting screen generated for each receipt image. The "Next" button 1402 is a button for displaying the Metadata setting screen for the next receipt image. In a case where the Metadata setting screen of the last receipt image among the receipt images cropped from the scanned image is displayed, "Next" 1402 is in the non-displayed state. The "Back" button 1403 is a button for displaying the Metadata setting screen of the one previous receipt image. In a case where the Metadata setting screen of the first receipt image among the receipt images cropped from the scanned image is displayed, the "Back" button 1403 is in the non-display state. A "Re-scan" button 1408 is a button for performing scan processing again for the document placed on the document table in a case where the character within the receipt image displayed in the image display area 1410 is blurred or fades and it is not possible to read the value information accurately, or the like. Then, in each of input fields 1404 to 1407 of four items (ExpenseTypeID, TransactionDate, Amount, Location) provided on the right side of the image display area 1410, each corresponding value in the displayed receipt image is input. In the "Expense Type" input field 1404, the candidates of the expense type are displayed and a user selects one from among the candidates displaying the expense type corresponding to the processing-target receipt. In the example in FIG. 13 described previously, a list of the character strings, such as "Hotel" and "Car Rental", is displayed as candidates. In the "Transaction Date" input field 1405, the date of transaction of the processing-target receipt is input. In the "Amount" input field 1406, the total amount of the processing-target receipt is input. Then, at the point in time of the initial display of the Metadata setting screen 1400, the information, such as "Date" and "Amount" within "ReceiptData" (see FIG. 12C), about the receipt image relating to the preview display is displayed as each initial value. As described above, as regards the items described in "ReceiptData" of the completion response, the information on the specific character string obtained by the analysis processing is displayed as the initial value at the point in time of the initial display of the Metadata setting screen, and therefore, it is possible for a user to save the time and effort necessary to input the corresponding value. However, in a case of the state where the receipt image cropped from the scanned image is not suitable to extraction of character information because of floating of the document over the document table, or the like, it is necessary for a user to manually modify the displayed initial value. The modification work such as this becomes more complicated as the number of items to be registered as metadata increases, and therefore, the burden of a user also increases. Consequently, the present embodiment is configured so that it is possible to give instructions to perform the scan processing again from the Metadata setting screen and is further configured so that the OCR processing and the value extraction processing are performed only for the receipt image for which the re-extraction of the specific character string (value information) is necessary. Due to this, it is possible for a user to efficiently perform the metadata setting work for a plurality of receipt images. In the "Location" input field 1407, the location at which the receipt is issued is input. In this case, for example, it may also be possible to display a list of location items as candidates so that the information on the location item is acquired additionally at the time of acquisition of the metadata item information described previously. As a method of manually inputting a value in the input fields 1405 to 1407, it is sufficient to display a keyboard on the screen in response to the pressing down of the target input field to enable a user to input an arbitrary figure or character string.

In a case where the pressing down of the "Re-scan" button 1408 described above is detected, the scan processing is performed again for each receipt placed on the document table and the analysis processing is performed for the scanned image obtained by this (hereinafter, called "re-scanned image") (S517). Here, S517 is represented as one piece of processing, but the contents thereof are configured by each piece of processing at S508 to S512 described previously. That is, after the scan processing is performed again, an analysis request for the re-scanned image is transmitted and the analysis processing therefor is performed in the MFP cooperative server 120. However, in the analysis processing for the re-scanned image, the OCR processing and the value extraction processing are not performed for all the receipts. That is, the OCR processing and the value extraction processing are performed only for the image area corresponding to the receipt image preview-displayed on the Metadata setting screen 1400 on which the "Re-scan" button 1408 is pressed down. Details of the processing relating to the re-scan will be described later.

The MFP 110 having received the completion response of analysis processing for the re-scanned image updates (re-displays) the Metadata setting screen on which the "Re-scan" button 1408 is pressed down (S518) based on the analysis results included in the completion response.

In a case where the log-in user who has completed inputting of the necessary information presses down the "Transmit" button 1401 within the Metadata setting screen 1400, the MFP 110 transmits a metadata setting request to the MFP cooperative server 120 (S519). At this time, the data relating to the above-described four items (ExpenseTypeID, TransactionDate, Amount, Location) input on the Metadata setting screen 1400 is transmitted in the format as shown in FIG. 15 along with the metadata setting request. It may also be possible to bring the "Transmit" button 1401 within the Metadata setting screen 1400 into the invalid state until the Metadata setting screen 1400 for all the receipt images cropped from the scanned image is displayed. Further, in the present embodiment, one Metadata setting screen is displayed for one receipt image, and therefore, it is necessary to transmit the metadata setting requests corresponding to the number of receipts detected within the scanned image. However, it may also be possible to make it possible to transmit the metadata setting requests for a plurality of receipt images en bloc.

The MFP cooperative server 120 having received the metadata setting request from the MFP 110 transmits a registration request for the receipt image relating to the request and a setting request for the metadata to the settlement server 130 (S520). The settlement server 130 having received the requests for image registration and metadata setting from the MFP cooperative server 120 performs processing to register and set the receipt image and the metadata relating to the requests to the expense information managed by the settlement server 130 itself. After that, the settlement server 130 returns a response indicating that the registration of the receipt image and the setting of the metadata are completed to the MFP cooperative server 120. Then, the MFP cooperative server 120 having received the above-described completion response from the settlement server 130 also returns the same completion response to the MFP 110.

The above is the flow of the processing of the entire image processing system.

Details of Processing in MFP

Figure 16:
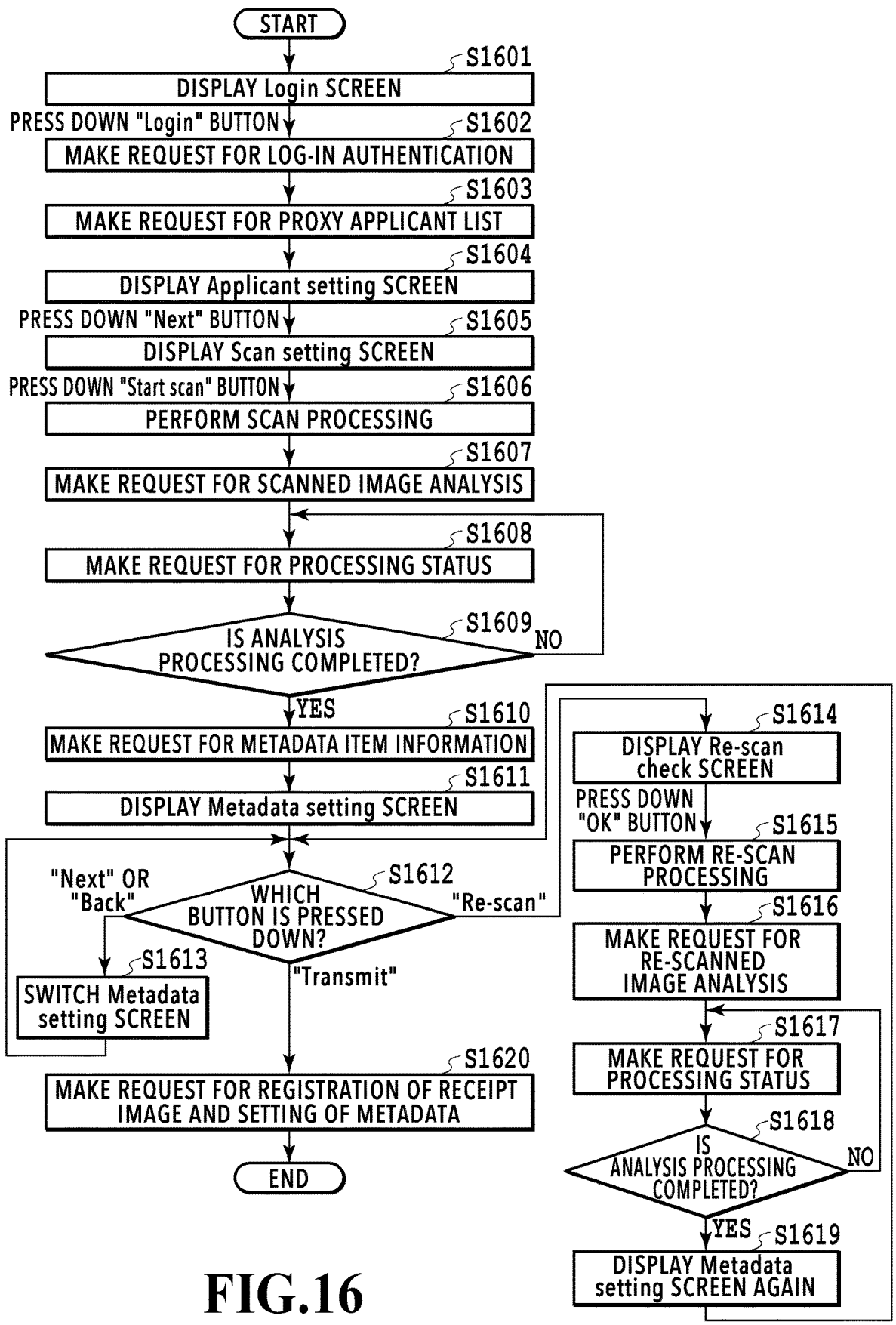
FIG. 16 is a flowchart showing a flow of expense settlement processing in the MFP.

Following the above, by focusing attention on the operation in the MFP 110, the processing in a case where expense settlement is performed in the image processing system described above is explained in detail. FIG. 16 is a flowchart showing a flow of the expense settlement processing in the MFP 110. This series of processing is implemented by the CPU 211 executing the control program stored in the HDD 214 and started in response to the pressing down of the "Settle expense" button 601 on the Main screen 600 described previously in the control unit 210. In the following, detailed explanation is given along the flowchart shown in FIG. 16. Symbol "S" at the top of each piece of processing means a step.

At S1601, the display control unit 421 displays the Login screen 700 described previously. In a case where a user name and a password are input in the input fields 702 and 703, respectively, on the Login screen 700 and the pressing down of the "Login" button 701 is detected, the processing advances to S1602.

At S1602, the cooperative service request unit 423 transmits a log-in authentication request to the MFP cooperative server 120. In a case where it is checked that the user is a genuine user by the log-in authentication in the MFP cooperative server 120, the cooperative service request unit 423 receives the access token from the MFP cooperative server 120.

The cooperative service request unit 423 having received the access token transmits an acquisition request for the proxy applicant list to the MFP cooperative server 120 along with the access token at S1603. Then, upon receipt of the proxy applicant list from the settlement server 130 via the MFP cooperative server 120, the cooperative service request unit 423 delivers it to the display control unit 421

At S1604, the display control unit 421 displays the Applicant setting screen 900 described previously based on the received proxy applicant list on the operation unit 220. At this time, in the selection field 902 on the Applicant setting screen 900, the user name of the log-in user him/herself is displayed as the initial value and in a case where the "Next" button 901 is pressed down without selecting a proxy applicant, the user registers the receipt images to the expense settlement service and so on as the application by the user him/herself. In a case where a user name is selected by the log-in user and the pressing down of the "Next" button 901 is detected, the processing advances to S1605. In a case where no user name exists in the proxy applicant list (no contents in the list), this step itself is skipped.

At S1605, the display control unit 421 displays the Scan setting screen 1000 described previously on the operation unit 220. In a case where a receipt is set on the document table by the log-in user and the pressing down of the "Start scan" button 1001 is detected, the display control unit 421 notifies the scan control unit 422 of that.

The scan control unit 422 having received the notification instructs the scan execution unit 411 to perform scan processing. Upon receipt of the instructions, the scan execution unit 411 scans the receipt placed on the document table. The scanned image data generated by the scan is saved in the canned image management unit 412 and the scan control unit 422 is notified of an identifier capable of specifying the scanned image. At this time, it may also be possible to display a message screen (not shown schematically) indicating that the scan is in progress on the display unit 220.

Next, at S1607, the cooperative service request unit 423 acquires the scanned image data via the scan control unit 422 and transmits it to the MFP cooperative server 120 along with the analysis request therefor. Based on the analysis request, in the MFP cooperative server 120, the analysis processing described previously is performed for the received scanned image data. At that time, a request ID is returned from the request control unit 431 of the MFP cooperative server 120.

The cooperative service request unit 423 having acquired the request ID transmits an acquisition request for the processing status to the MFP cooperative server 120 along with the request ID at S1608. Based on the acquisition request, the MFP cooperative server 120 returns a response in accordance with the progress situation of the analysis processing specified by the request ID to the MFP 110.

At S1609, in a case where the response received by the cooperative service request unit 423 from the MFP cooperative server 120 is the contents indicating that the processing is in progress (see FIG. 12B), the processing returns to S1608. Then, after waiting for a predetermined time (for example, about several seconds) to elapse, the cooperative service request unit 423 transmits the acquisition request for the processing status to the MFP cooperative server 120 again. In a case where the received response is the contents indicating completion (see FIG. 12C), the processing advances to S1610.

At S1610, the cooperative service request unit 423 transmits an acquisition request for metadata item information to the MFP cooperative server 120 along with the access token. Based on the acquisition request, the MFP cooperative server 120 acquires the metadata item information on the target user associated with the access token from the settlement server 130 and returns it to the MFP 110.

At S1611, the display control unit 421 displays the Metadata setting screen 1400 described previously on the operation unit 220. At S1612 that follows, the display control unit 421 determines the next processing in accordance with the contents of the user operation on the Metadata setting screen 1400. In a case where the pressing down of the "Next" button 1402 or the "Back" button 1403 is detected, the processing advances to S1613, in a case where the pressing down of the "Re-scan" button 1408 is detected, the processing advances to S1614, and in a case where the pressing down of the "Transmit" button 1401 is detected, the processing advances to S1621, respectively.

Figure 17:
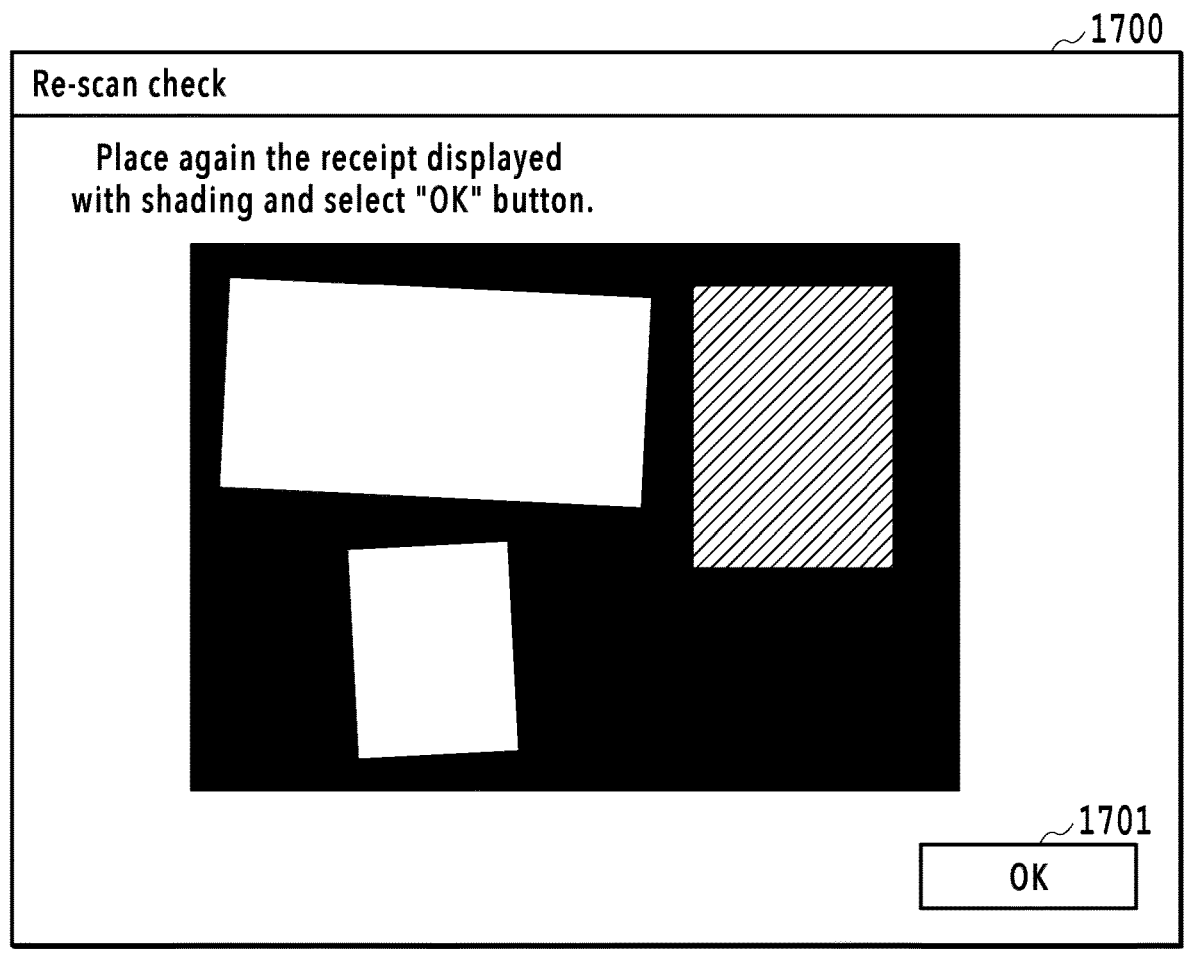
FIG. 17 is a diagram showing an example of a check screen at the time of re-scan.

At S1613 in a case where the operated button is the "Next" button 1402 or the "Back" button 1403, the display control unit 421 sequentially switches the receipt images to be displayed in the image display area 1410 in accordance with the information described in "Images" of the completion response. On the other hand, at S1614 in a case where the operated button is the "Re-scan" button 1408, the display control unit 421 displays a check screen before execution of re-scan (hereinafter, called "Re-scan check screen") on the operation unit 220. The display method at this time may be, for example, a popup display in another window, or may be a switched display from the Metadata setting screen 1400. On a Re-scan check screen 1700, the entire scanned image acquired at S1606 is displayed in a reduced state. At that time, in a case where the scanned images are displayed without performing anything, the scanned image placed on the left side is displayed on the right side, and therefore, the scanned images are displayed by reversing the positional relationship in the horizontal direction. Further, in order to make it easy to recognize the receipt that needs to be rewritten, the receipt is highlighted by overlapping a shaded image or the like based on the coordinate information on each receipt image, which is included in the completion response. At this time, it may also be possible to fill the characters and the like of the other receipts in white, or produce a transparent display so that the characters and the like can be recognized. FIG. 17 is a diagram showing an example of the Re-scan check screen. Here, it is assumed that the date and the amount cannot be read correctly from the corresponding receipt image as a result of scanning a receipt 1101 at top right in FIG. 11A in the state where the receipt floats up over the document table, and therefore, erroneous initial values are displayed in the input fields 1405 and 1406. Then, it is further assumed that the "Re-scan" button 1408 is pressed down by a user. On the Re-scan check screen 1700 shown in FIG. 17, among the three receipts placed on the document table in the facedown state, the re-scan target receipt 1101 of interest (hereinafter, called "receipt of interest") is displayed in the shaded state. A user refers to the Re-scan check screen 1700 and places the receipt of interest 1101 again after smoothing wrinkles and so on to prevent the receipt of interest 1101 from floating up, and then, presses down an "OK" button 1701 on the screen. Due to this, the scan control unit 422 is instructed to perform the scan processing again by the display control unit 421.

At S1615, the scan control unit 422 instructs the scan execution unit 411 to perform the scan processing again as at S1606 described previously. Upon receipt of the instructions, the scan execution unit 411 performs the scan processing for the receipt placed on the document table. At the time of this scan processing, in order to obtain a more appropriate scanned image, it may also be possible to change the default setting of the contents of each item in the scan setting (for example, by increasing the resolution and the density, and so on). Here, the scanned image obtained by the scan processing (re-scan processing) at this step is called "re-scanned image" in order to distinguish this scanned image from the scanned image obtained by the first scan processing. The generated re-scanned image data is saved in the scanned image management unit 412 and the scan control unit 422 is notified of an identifier capable of specifying the re-scanned image.

Next, at S1616, the cooperative service request unit 423 acquires the re-scanned image data via the scan control unit 422 and transmits the data to the MFP cooperative server 120 along with an analysis request therefor. In this case, in the analysis request for the re-scanned image, information for specifying the image area corresponding to the receipt of interest, specifically, coordinate information indicating the image area of the receipt of interest in the scanned image obtained by the most recent scan processing is included. Here, the analysis request that is transmitted at this step is called "re-analysis request" in order to distinguish this analysis request from the first request at S1607 described previously. Based on the re-analysis request, the MFP cooperative server 120 performs the analysis processing described previously for the received re-scanned image data, but the contents thereof are different from those of the first analysis processing. That is, among each receipt image obtained by the multi-cropping processing for the re-scanned image, only for the receipt image corresponding to the receipt of interest specified based on the coordinate information described above, the OCR processing and the value extraction processing are performed and the specific characteristic string (value information) is extracted. It is sufficient to specify the receipt image corresponding to the receipt of interest at this time by, for example, finding the degree of overlap between the rectangular area indicated by the coordinate information within the re-analysis request and the image area corresponding to each receipt in the re-scanned image and specifying the image area whose degree of overlap is higher than or equal to a threshold value (for example, 80%). Alternatively, it may also be possible to specify the image area whose degree of overlap is the highest. In the following, the analysis processing that is performed in accordance with the re-analysis request is called "re-analysis processing". To the re-analysis request also, a request ID is returned from the request control unit 431 of the MFP cooperative server 120.

The cooperative service request unit 423 having acquired the request ID transmits an acquisition request for the processing status to the MFP cooperative server 120 along with the request ID at S1617, as at S1608. Based on the acquisition request, the MFP cooperative server 120 returns a response in accordance with the progress situation of the re-analysis processing specified by the request ID to the MFP 110. FIG. 18 is a diagram showing an example of the completion response of the re-analysis processing for the re-scanned image of the receipt 1101 shown FIG. 11A. As shown in FIG. 18, only each of pieces of information on "ImageID", "ContentsType", "ReceiptData", and "Points" configuring "Images" within the response, which correspond to the specific receipt 1101, are included. This means that in the re-analysis processing, the processing for extracting the specific character string (value information) is performed only for the cropped image corresponding to the receipt 1101 and the processing is not performed for the other cropped images corresponding to the receipts 1102 and 1103.

In a case where the response received by the cooperative service request unit 423 from the MFP cooperative server 120 is the contents indicating that the processing is in progress at S1618, the processing returns to S1617. Then, after waiting for a predetermined time (for example, about several seconds) to elapse, the cooperative service request unit 423 transmits an acquisition request for the processing status to the MFP cooperative server 120 again. In a case where the received response is the contents indicating completion, the processing advances to S1619.

At S1619, the display control unit 421 displays the Metadata setting screen 1400 of the receipt of interest relating to the re-scan again by using the contents of the received completion response. On this Metadata setting screen 1400 that is displayed again, the receipt image cropped from the re-scanned image is preview-displayed in the image display area 1410. Further, in the input fields 1405 and 1406, the date of transaction and the value of amount based on the description contents of "ReceiptData" in the completion response of the re-analysis processing are displayed as the initial values, respectively. After the Metadata setting screen 1400 is displayed again, the processing returns to S1612. Then, the next processing is determined in accordance with the contents of the user operation on the Metadata setting screen 1400 that is displayed again. That is, in a case where the pressing down of the "Next" button 1402 or the "Back" button 1403 is detected, the processing advances to S1613, in a case where the pressing down of the "Re-scan" button 1408 is detected, the processing advances to S1614, and in a case where the pressing down of the "Transmit" button 1401 is detected, the processing advances to S1620, respectively.

At S1620, the cooperative service request unit 423 transmits a request for registration of each receipt image and setting of the metadata to the MFP cooperative server 120 based on the user input on the Metadata setting screen 1400. At this time, ImageId of the target receipt image is transmitted together, and in a case where the log-in user is a person (proxy applicant) other than the log-in user him/herself, UserID of the proxy applicant is also transmitted, in addition to ImageID. The MFP cooperative server 120 having received the request transmits the same request to the settlement server 130. Then, in the settlement server 130, the registration of the receipt image and the setting of the metadata are performed in association with the log-in user in a case where the application is by the log-in user him/herself, or in association with the proxy applicant in a case where the application is by the proxy applicant. Then, in a case where the registration of each receipt image and the setting of the metadata are completed, the response of the setting completion is returned to the MFP cooperative server 120 and the MFP 110 receives the response of the setting completion from the MFP cooperative server 120.

The above is the flow of the processing in a case where the expense settlement is performed by focusing attention on the operation in the MFP 110.

Modification Example

The above-described embodiment premises that the number of receipts placed on the document table in the first scan processing (S1606) does not change and the same in the second and subsequent re-scan processing (S11615). That is, it is premised that the second and subsequent re-scan processing is performed in the state where only the receipt that needs to be placed again is placed again at substantially the same position by a user and the other receipts are not placed again. On the other hand, in the present modification example, it may also be possible to prompt a user to perform the re-scan after removing the other receipts from the document table at the time of placing the receipt again, which is determined to be placed again. In a case of this modification example, the only one receipt image is extracted from the re-scanned image, and therefore, it is no longer necessary to include the coordinate information on the receipt image corresponding to the receipt of interest within the re-analysis request. In a case where the re-scan is performed with only the receipt that needs to be placed again being left on the document table, it is sufficient to display the Metadata setting screen by using the results of the re-analysis processing for the receipt and using the analysis results at the time of the first scan and the cropped images for the other receipts, respectively.

Further, as another modification example, it is considered that a user also places again the receipts other than the receipt determined to be placed again, and therefore, the arrangement order of each receipt may be changed. Consequently, in a case where the results of the re-analysis processing for the re-scanned image indicate that the number of document images, the sizes, and the character recognition results are different from those before the re-scan, it is sufficient to cause a user to perform the processing from the beginning (cause a user to perform the OCR processing and the like for all the receipt images cropped from the re-scanned image).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, in a case where a user scans a plurality of document en bloc and acquires an image in units of documents and metadata thereon by using a multi-cropping function, it is made possible for the user to reacquire them efficiently.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-103751, filed Jun. 3, 2019 which is hereby incorporated by reference wherein in its entirety.

What is claimed is:

1. An image processing apparatus comprising:
   at least one memory that stores a program; and
   at least one processor that executes the program to perform:
   (1) giving instructions to perform analysis processing to (a) crop document images corresponding to a plurality of documents from a scanned image generated by scanning the plurality of documents placed on a document table of a scanner and (b) extract at least one character string from each of the cropped document images; and
   (2) displaying, on a display unit, a first user interface screen for setting metadata for each of the cropped document images in units of the cropped document images,
   wherein the first user interface screen includes (a) a preview area, (b) at least one input field, and (c) an input element,
   wherein one of the cropped document images is preview-displayed in the preview area,
   wherein the extracted at least one character string corresponding to the preview-displayed one of the cropped document images is displayed as an initial value of the metadata in the at least one input field,
   wherein, if a user operates the input element, the processor controls the scanner to perform a scan again so as to obtain a re-scanned image, and performs analysis processing of the re-scanned image for an image area corresponding to the one of the cropped document images being preview-displayed when the input element is operated by the user,
   wherein the analysis processing of the re-scanned image is performed without the user selecting a crop area, and
   wherein for each of the cropped document images other than the one of the cropped document images being preview-displayed when the input element is operated by the user, the analysis processing of the re-scanned image is not performed for an image area corresponding to the cropped document image.

2. The image processing apparatus according to claim 1, wherein the analysis processing of the re-scanned image is performed only for the image area in the re-scanned image which corresponds to the one of the cropped document images being preview-displayed when the input element is operated by the user, to extract a character string.

3. The image processing apparatus according to claim 1, wherein in the analysis processing of the re-scanned image, the image area is determined based on a degree of overlap between (a) coordinate information of the one of the cropped document images being preview-displayed when the input element is operated by the user and (b) an image area corresponding to each document in the re-scanned image.

4. The image processing apparatus according to claim 1, wherein the first user interface screen on which a user operation to the input element has been performed is displayed again based on results of the analysis processing for the re-scanned image.

5. The image processing apparatus according to claim 1, wherein a second user interface screen is further displayed that prompts placing a document again, which corresponds to the preview-displayed one of the cropped document images, in a case where a user operation to the input element is detected.

6. The image processing apparatus according to claim 5, wherein on the second user interface screen, an entire scanned image is preview-displayed in which an image area is highlighted so that a position on the document table of a document corresponding to the preview-displayed one of the cropped document images is understood.

7. The image processing apparatus according to claim 1, wherein the scanner performs the scan processing again by changing an operation condition at the time of a scan.

8. The image processing apparatus according to claim 1, wherein the image processing apparatus is connected with an external apparatus via a network, and
wherein the analysis processing is performed by the external apparatus.

9. The image processing apparatus according to claim 1, wherein the analysis processing is performed in the image processing apparatus.

10. An image processing method comprising:
(1) giving instructions to perform analysis processing to (a) crop document images corresponding to a plurality of documents from a scanned image generated by scanning the plurality of documents placed on a document table of a scanner and (b) extract at least one character string from each cropped document images; and
(2) displaying, on a display unit, a first user interface screen for setting metadata for each of the cropped document images in units of the cropped document images,
wherein the first user interface screen includes (a) a preview area, (b) at least one input field, and (c) an input element,
wherein one of the cropped document images is preview-displayed in the preview area,
wherein the extracted at least one character string corresponding to the preview-displayed one of the cropped document images is displayed as an initial value of the metadata in the at least one input field,
wherein, if a user operates the input element, the scanner is controlled to perform a scan again so as to obtain a re-scanned image, and analysis processing of the re-scanned image is performed for an image area corresponding to the one of the cropped document images being preview-displayed at the time when the input element is operated by the user,
wherein the analysis processing of the re-scanned image is performed without the user selecting a crop area, and
wherein for each of the cropped document images other than the one of the cropped document images being preview-displayed when the input element is operated by the user, the analysis processing of the re-scanned image is not performed for an image area corresponding to the cropped document image.

11. A non-transitory computer-readable storage medium storing a program for causing a computer to perform an image processing method, the image processing method comprising:
(1) generating a scanned image by scanning a plurality of documents placed on a document table;
(2) giving instructions to perform analysis processing to (a) crop document images corresponding to the plurality of documents from the generated scanned image and (b) extract at least one character string from each of the cropped document images; and
(3) displaying, on a display unit, a first user interface screen for setting metadata for each of the cropped document images in units of the cropped document images,
wherein the first user interface screen includes (a) a preview area, (b) at least one input field, and (c) an input element,
wherein one of the cropped document images is preview-displayed in the preview area,
wherein the extracted at least one character string corresponding to the preview-displayed one of the cropped document images is displayed as an initial value of the metadata in the at least one input field,
wherein, if a user operates the input element, the scanner is controlled to perform a scan again so as to obtain a re-scanned image, and analysis processing of the re-scanned image is performed for an image area corresponding to the one of the cropped document images being preview-displayed at the time when the input element is operated by the user,
wherein the analysis processing of the re-scanned image is performed without the user selecting a crop area, and
wherein for each of the cropped document images other than the one of the cropped document images being preview-displayed when the input element is operated by the user, the analysis processing of the re-scanned image is not performed for an image area corresponding to the cropped document image.

* * * * *